United States Patent [19]

Dunn, Jr.

[11] 3,887,694

[45] June 3, 1975

[54] PRODUCTION OF CHLORINE

[75] Inventor: Wendell E. Dunn, Jr., Sydney, Australia

[73] Assignee: Titanium Technology N.V., Curacao, Netherlands Antilles

[22] Filed: Dec. 22, 1972

[21] Appl. No.: 317,744

Related U.S. Application Data

[63] Continuation-in-part of Ser. No. 108,571, Jan. 21, 1971, abandoned.

[52] U.S. Cl. ............... 423/500; 423/463; 423/504; 423/633
[51] Int. Cl. .............................................. C01b 7/00
[58] Field of Search ............ 423/500, 504, 463, 633

[56] References Cited

UNITED STATES PATENTS

| 2,206,399 | 7/1940 | Grosvener et al. ................. 423/507 |
| 3,376,112 | 4/1968 | Dunn et al. ......................... 423/463 |
| 3,729,543 | 4/1973 | Dunn ................................... 423/463 |

Primary Examiner—Oscar R. Vertiz
Assistant Examiner—Brian E. Hearn

[57] ABSTRACT

A process is claimed for producing elemental chlorine by oxidizing, with an oxygen-containing gas at a temperature of 400° to 1,200°C., an alkali-metal tetrachloroferrate produced by heating an aqueous ferric chloride with an alkali-metal chloride in the temperature range of 180° to 310°C.

11 Claims, No Drawings

PRODUCTION OF CHLORINE

REFERENCE TO PRIOR APPLICATIONS

This application is a continuation-in-part of my co-pending application Ser. No. 108,571, filed Jan. 21, 1971, now abandoned.

FIELD OF THE INVENTION

This invention relates to a process for producing elemental chlorine, from chloride, including waste chlorides.

BACKGROUND OF THE INVENTION

The oxidation of chlorine-containing substances, using air has been extensively studied as a means for producing elemental chlorine inexpensively. Prior to the invention, disclosed herein, others have taught the oxidation of ferric chloride to chlorine. For example, Grosvenor U.S. Pat. No. 2,206,399 teaches the oxidation of ferric chloride using a "booster" or a catalyst consisting of a non-alkali-metal chloride and a complex method of recirculating the ferric chloride as a porous mass accompanied by the catalyst to the oxidizer. Also, I have taught in U.S. Pat. No. 3,376,112 a process for making chlorine by the oxidation of a molten salt complex prepared by heating anhydrous ferric chloride and sodium chloride.

The processes disclosed herein provide improvements over those taught in U.S. Pat. No. 3,376,112 which teaches the oxidation of anhydrous ferric chloride.

My process is an improvement over Grosvenor in that it is adaptable to an oxidation process for aqueous or hydrated ferric chloride whereas Grosvenor uses hydrogen chloride, it does not require transport of a special "adapted mass" for conversion of hydrogen chloride, it does not require a catalyst or booster, and it is adapted to convert ferric chloride, ferrous chloride, hydrogen chloride or hydrochloric acid or a mixture of same to chlorine.

My new process permits the use of waste ferric chloride containing water which cannot be used in the process disclosed in U.S. Pat. No. 3,376,112 and which presents a costly waste disposal and pollution problem. For example, by my process, waste "pickle liquor" resulting from the hydrochloric acid treatment of corroded steel can be coverted into chlorine and solid iron which can be easily disposed of.

A modification of my process permits the recovery of waste or by-product hydrogen chloride or hydrochloric acid, which also poses a serious disposal problem.

SUMMARY OF THE INVENTION

This invention is directed to an improved process for producing elemental chlorine comprising the steps of reacting at a temperature in the range of 180° to about 310°C., a mixture of ferric chloride with an alkali metal chloride to form an alkali-metal tetra-chloroferrate and heating said alkali-metal tetra-chloroferrate to a temperature of 400° to 1,200°C. and preferably 400° to 650°C. with an oxygen-containing gas. The improvement comprises heating with an oxygen-containing gas the product obtained by heating to a temperature of about 250°C.; a mixture comprising a water-containing ferric chloride selected from the group consisting of hydrated ferric chloride of the formula.

wherein $n$ is a number from 0.5 to 6, aqueous solutions of ferric chloride and a mixture of ferric chloride and hydrochloric acid, with an alkali-metal chloride.

This process is also directed to a process for producing chlorine comprising the steps of:

a. heating a mixture comprising:
1. a hydrated ferric chloride of the formula $FeCl_3 \cdot nH_2O$ wherein $n$ is a number in the range of 0 to 6 or an aqueous solution of ferric chloride wherein the mole ratio of sodium chloride to ferric chloride is in the range of 0.75:1 to 4:1 or higher and preferably 0:9:1 to 1.5:1;
2. iron oxide;
3. water; and
4. hydrogen chloride or hydrochloric acid; at a temperature in the range of 180° to 310°C. and distilling all of the water as water or hydrochloric acid to produce a dehydrated product;

b. reacting the mixture of (a) with an oxygen-containing gas, at a temperature in the range of 400° to 1,200°C. and preferably 400° to 650°C. to produce chlorine, iron oxide and unreacted chlorides; and c. separating the chlorine produced.

The process of this invention is useful for producing chlorine which is useful for preparing chlorinated hydrocarbon including insecticides.

DESCRIPTION OF THE PREFERRED EMBODIMENTS

I have invented an improvement of the Deacon process for producing chlorine. The Deacon process is a well-known method of producing chlorine by the oxidation of hydrogen chloride with oxygen. A modified Deacon process for the oxidation of anhydrous ferric chloride proceeds by the following reaction:

$$4FeCl_3 + 3O_2 \rightarrow 6Cl_2 + 2Fe_2O_3$$

However, it is inconvenient to use ferric chloride in this process due to its volatility. Mixture of ferric chloride with other substances have been used in order to minimize the difficulties arising due to the volatility of ferric chloride. For example, it is taught in U.S. Pat. No. 3,376,112 that the "molten salt complex" comprising of liquid composed of $FeCl_3$ and $NaCl$ can be used as reactants to prepare chlorine. U.S. Pat. No. 3,376,112 teaches that the process is conducted under anhydrous conditions.

I have invented a process for preparing chlorine comprising the steps of oxidizing an alkali-metal tetra-chloroferrate formed by heating an alkali-metal chloride and preferably, sodium chloride or potassium chloride, with an aqueous solution of ferric chloride, a ferric chloride hydrate or by reacting the alkali-metal chloride with a solution of ferric chloride dissolved in hydrochloric acid to a temperature in the range of 180° to 310°C. for 0.1 to 1 hours or longer. The preparation of alkali-metal tetra-chloroferrates is disclosed in my patent application Ser. No. 108,570 filed Jan. 21, 1971 now U.S. Pat. No. 3,729,543. Heating an alkali-metal tetra-chloroferrate with an oxygen-containing gas such as air, oxygen or oxygen enriched air at a temperature of 400° to 650°C. produces good yields of chlorine gas, that is, up to 90% yields and better. This invention is a vast improvement on the prior art method since it avoids the use of costly anhydrous ferric chloride and anhydrous conditions are not required. My improved process provides both savings due to the use of inexpensive raw materials to provide chlorine at a lower cost and at the same time it provides flexibility and ease of operation by eliminating the requirement of maintaining anhydrous conditions. A further benefit obtained is the elimination of chloride waste streams.

The conditions used to oxidize the alkali-metal tetra-chloroferrate or potassium tetra-chloroferrate with an oxygen-containing gas are temperature dependent upon the oxidation system used and in general temperatures in the range of about 400° to 1,200°C. are used. In the equipment described in U.S. Pat. No. 3,376,112 the temperature used is 400° to 650°C. In the equipment described in U.S. Pat. No. 2,657,976, the temperatures used are 800°C. or higher.

The equipment used in my process is similar to that described in U.S. Pat. No. 3,376,112 and, in general, is stainless steel or a corrosion resistant material such as the well-known corrosion resistant ceramics and nickel alloys. The chloride moiety and oxygen containing gas is introduced into the reader and heated therein as described above.

The oxygen-containing gas can be either oxygen, air or oxygen enriched air. The chlorine obtained contains a small amount of oxygen. In general, the amount of oxygen used is 10 to 30 mole percent in excess of the stoichiometric amount required to oxidize the ferric chloride values in alkali-tetra-chloroferrate. When air is used the chlorine produced contains both nitrogen and oxygen.

Aqueous ferric chloride can be prepared by reacting iron oxide with hydrochloric acid. Any ferrous chloride present can be converted to ferric chloride by oxidation.

The oxidation process can be conducted with a small quantity of ferrous or ferric chloride present in the dehydration product.

The process of this invention provides a method of utilizing hydrogen chloride-containing by-products or waste streams. This modification involves the reaction of hydrogen chloride with iron oxide, e.g., 5% by weight, formed during the dehydration of the water-containing mixture of ferric chloride and sodium chloride heated in the range of 310°C. and preferably 180° to 250°C. Alternatively iron oxide can be added to the mixture along with waste hydrogen chloride or hydrochloric acid and the mixture heated in the range of 180° to 310°C. and preferably 180° to 250°C. for 0.1 to 1 hour or longer. The hydrogen chloride reacts with iron oxide to form iron chloride which in turn reacts with sodium chloride to form sodium tetra-chloroferrate. Sodium-tetra-chloroferrate which is a liquid above a temperature of about 159°C., can be heated to a temperature of 160° to 310°C. and pumped to the oxidation reactor described in U.S. Pat. No. 3,376,112 where it is contacted with air or oxygen to form chlorine.

When anhydrous hydrogen chloride and anhydrous ferric chloride is used, water is added to provide a reaction medium. The water of hydration of hydrated ferric chloride can also serve as the water required for the reaction medium.

The process can use ferrous chloride as the iron chloride moiety if the ferrous chloride is oxidized by air to ferric chloride during the dehydration step.

The chlorine obtained by the oxidation can be separated from the other by-products by means of a cyclone. The iron oxide and sodium chloride by-products as well as untreated sodium tetra-chloroferrate can be recycled to oxidation to effect an almost complete conversion of the chloride values to chlorine.

The iron oxide formed can be separated from the sodium chloride by leaching with water. The iron oxide is easily disposed as land-fill or can be used in steel making.

Excellent yields of chlorine are obtained by the process of this invention. For example yields of 90% or higher are not uncommon.

The invention is further illustrated by the following examples.

EXAMPLE 1

In a hot aqueous concentrated solution of ferric chloride (containing hydrochloric acid) similar to spent "pickle liquor" was dissolved sodium chloride on a 1.1 mole per mole basis with the ferric chloride to give an excess of sodium chloride. In a series of experiments the solution was heated in separate Vycor flasks to the temperatures listed in the table below and heated at that temperature for 30 minutes. Each solution was allowed to cool to room temperature and the weight of the contents of the flask was determined. The solution was filtered and the weight of the insolubles was determined. These data are summarized in the Table below:

| Temperature °C. | Weight of solution (g.) | Weight Loss (g.) | Insolubles (g.) |
|---|---|---|---|
| 120 | 164.35 | 21.9 | 0.65 |
| 140 | 165.35 | 41.9 | 0.30 |
| 180 | 164.35 | 44.3 | 2.0 |
| 250 | 164.35 | 60.3 | 5.2 |

The product obtained was liquid sodium tetra-chloroferrate and solid iron oxide.

Hydrochloric acid or hydrogen chloride available as waste streams or made by the reaction of waste chlorides with sulfuric acid can be added to the above iron chloride/sodium chloride complex and dehydrated at temperatures of 180° to about 310°C. The hydrogen chloride and/or hydrochloric acid which is a product of the last stage of dehydration step can be used as a source of chlorine values. In this modification, additional iron oxide is added to react with the hydrogen chloride and/or hydrochloric acid and additional sodium chloride is added to react with the ferric chloride formed thereby. Essentially a complete conversion of chloride to chlorine occurs by recycling unreacted sodium tetra-chloroferrate from the oxidation step.

EXAMPLE II

A continuous feed of 1 mole of $FeCl_3 \cdot 6H_2O$, 1.1 moles of NaCl and 0.2 moles of $Fe_2O_3$ was added to a dehydrator, having a 30 minute liquid retention time, fitted with a vapor condensing train and a hydrogen chloride concentrator, is heated to 250°C. The product obtained was anhydrous $NaFeCl_4$ mixed with 0.1 NaCl and 0.2 mole $Fe_2O_3$. The condense vapor is fractionated to constant boiling aqueous HCl stream and returned to the dehydrator and the stripped $H_2O$ sent to waste. The boiling action provides a liquid stirring action.

The dehydrated product is suitable to be fed to the oxidizer to produce $Cl_2$. As described above the by-products of the oxidation are returned to the dehydrator as part of the continuous feed stream.

EXAMPLE III

A further refinement of this invention is practiced by having a two stage dehydrator, wherein the first stage fed as in Example II operates at 180°C., producing a partially dehydrated $NaFeCl_4$ containing 1.3 moles of $H_2O$ and producing a vapor pase containing about 0.2 moles of HCl. The second stage vapor contains about 1.6 moles of HCl and 1.3 moles of $H_2O$ which condenses to a concentrated hydrochloric acid which is returned to the first state for recovery. The second stage fluid product is anhydrous $NaFeCl_4$ mixed with NaCl and $Fe_2O_3$. The first stage vapor can be reconcentrated or if suitably low in chloride content discharged to waste.

EXAMPLE IV

A tubular reactor about 3 feet in diameter and 30 feet in length was filled with a porcelain packing. The reaction was heated externally to a temperature in the range of 500°C. Oxygen and the liquid stream, heated to a temperature of 250°C., consisting of the reaction product described above predominately of $NaFeCl_4$ containing a small amount of $Fe_2O_3$ (about 5%, by weight) were continuously pumped into the top of the reactor described in U.S. Pat. No. 3,376,112 at the rate of 20 pounds per minute. The moles of oxygen added was adjusted to be slightly in excess of an amount representing three moles of oxygen per two moles of the $NaFeCl_4$ added. The gaseous product was withdrawn from the bottom of the reactor. The gaseous product is about 90%, by weight, chlorine and 10%, by weight, oxygen.

The porcelain packing was removed, allowed to cool shaken to remove $Fe_2O_3$ and washed with water to remove sodium chloride. The sodium chloride solution can be recycled to produce additional $NaFeCl_4$. The porcelain packing is recycled to the reactor.

Example 4 can be used to produce chlorine from the potassium salt of $KFeCl_4$ by using 74.6 lbs. of potassium chloride instead of 54.4 lbs. of NaCl.

The product chlorine can be used in many processes without further purification or it can be purified to remove oxygen and nitrogen by condensation and fractional distillation by processes well-known in the art.

This process produces chlorine using oxidation facilities which may be and generally are associated with a chlorine utilizing process, e.g., a chloride process for $TiO_2$ pigment production. In this role my invention serves to use incrementally process facilities already in existence to reuse chlorine values degraded to chlorides and restore them to use in the associated process rather than dumping or expelling the waste chloride into the environment.

The foregoing detailed description has been given for clarity of understanding only and no unnecessary limitations are to be understood therefrom. The invention is not limited to the exact details shown and described for obvious modifications will occur to those skilled in the art.

The preferred embodiments in which an exclusive privilege or position is claimed are as follows:

1. A process for producing chlorine comprising the steps of:
   a. heating a mixture comprising:
      1. a hydrated ferric chloride of the formula $FeCl_3 \cdot nH_2O$ wherein $n$ is a number in the range of 0 to 6 or an aqueous solution of ferric chloride and an alkali-metal chloride wherein the mole ratio of alkali-metal chloride to ferric chloride is in the range of 0.75:1 to 4:1;
      2. ferric oxide wherein the mole ratio of ferric oxide to ferric chloride is 0.2 to 1.0;
      3. water; and
      4. at least a sufficient amount of hydrogen chloride or hydrochloric acid to react with iron oxides a at a temperature in the range of 180° to 310°C. and distilling all of the water as water or hydrochloric acid to produce a dehydrated product; and
   b. reacting the dehyrated product of (a) with at least a stoichiometric amount of an oxygen containing gas, at a temperature in the range of 400° to 1,200°C., to produce chlorine, iron oxide and unreacted chlorides.

2. The process of claim 1 wherein the dehydrated product of step (a) is produced by heating the mixture at a temperature in the range of 180° to 250°C. for 0.1 to 1.0 hour.

3. The process of claim 2 wherein the alkali-metal chloride is sodium chloride and wherein the mole ratio of sodium chloride to ferric chloride is in the range of 1.1 to 1.8:1.

4. The process of claim 3 wherein the dehydrated product is contacted with air at a temperature in the range of 400° to 650°C.

5. The process of claim 1 wherein unreacted anhydrous iron chlorides are mixed with the dehydrated product and the mixture formed thereby is reacted with an oxygen-containing gas at a temperature in the range of 400° to 1,200°C. to produce chlorine, iron oxide and additional unreacted chlorides.

6. The process of claim 1 wherein $n$ is in the range of 0.5 to 6. and the alkali-metal chloride is sodium chloride.

7. The process of claim 1 wherein the alkali-metal chloride is sodium chloride and the mole ratio of sodium chloride to ferric chloride is 1:1 to 1.8:1.

8. The process of claim 1 wherein the oxygen-containing gas is oxygen, air or oxygen enriched air.

9. The process of claim 1 wherein the mole ratio of oxygen used is in the range of the stoichiometric moles of oxygen required to oxidize the ferric chloride used to 3.0 times the stoichiometric moles of oxygen required to oxidize the ferric chloride used.

10. The process of claim 1, wherein the dehydrated product contains 0.5 to 50%, by weight, of ferrous chloride or ferric chloride.

11. The process of claim 1 wherein the amount the mixture heated in (a) contains 0.1 to 20%, by weight of hydrogen chloride.

* * * * *